Patented Nov. 7, 1933

1,934,294

UNITED STATES PATENT OFFICE 1,934,294

PROCESS RELATING TO COLLOIDS AND THEIR CHARACTERISTICS

John L. Brown, Catonsville, Md.

No Drawing. Original application March 6, 1922, Serial No. 541,374. Divided and this application June 3, 1929. Serial No. 368,205

4 Claims. (Cl. 252—6)

The object of my process is the manufacture of hydrates to be used in the production of colloids.

A further object of my process is an improved means for obtaining a colloidal gel.

A further object of my process is the peptizing of hydrosol through the use of tantalic acid.

A further object of my process is the process of forming a protective colloid employing tantalic acid, as an example, with zirconium gel.

A further object of my process is the mixing of acid and basic soluble colloids to form insoluble compounds.

A further object of my process is an improved process of coagulated colloidal separation by substituting in place of membranous filtration a reversible colloid as a selective agency in the separation.

A further object of my process is the selective separation of colloids by means analogous to magnetic means.

A further object of my process is the physical treatment of the colloid to develop the characteristic desired.

A further object of my invention is an improved process of combining sodium sulphate in a continuous operation to form colloids of the elements desired.

A further object of my process is the forming of a protective colloid employing metazirconium acid as an example with tantalum gel, the reverse of an object stated above.

A further object of my invention is the separation of crystalloids and colloids by means of the selective agency of glue, or its organic equivalent.

With the foregoing and other objects in view, my invention consists of the novel process relating to colloids and their characteristics, wherein are shown desirable embodiments of my invention, but it is understood that different agencies, elements and operations may be resorted to which come within the scope of the claims hereunto appended.

To definitely illustrate one application of my process for obtaining a colloidal gel, I will describe the manufacture of zirconium hydrates, supposedly consisting of (ZrH₂O₃).

In the ordinary process, sodium sulphate is milled or pulverized (a dangerous operation). I fuse sodium sulphate without milling with zirconia, and owing to the low melting point of the sodium sulphate, a molten bath of the same forms a viscous bubbling mass, intimately attacking the zirconia introduced therein.

As a specific charge illustration I use 4 lbs. of sodium sulphate, fuse the same, then add 1 lb. of zirconia and allow to cook one hour, then draw the same off into asbestos molds or any suitable container.

The cakes thus molded are dissolved in distilled water and allowed to crystallize out. The crystals show by analysis from one batch—

|  | Per cent |
|---|---|
| Water on drying | 41.67 |
| Zirconium containing substances | 5.44 |
| Sulphur trioxide | 30.32 |
| Sodium containing substances | 22.57 |

The analysis shows the zirconium precipitated as zirconium containing compounds probably made up of zirconium oxide and zirconium sulphate. The purification of the zirconium containing substances is effected by dissolving the crystals by using the necessary heat, water or steam. Which solution upon allowing to stand crystallizes out the containing substances, the superfluous water being removed from the top and the remainder allowed to solidify. Whereupon, owing to the different specific gravities of the separating compounds, a distinct line of demarcation determines a proper point of separation between the sodium containing substances and the zirconium containing substances. The latter are re-dissolved in dilute hydrochloric acid.

From the solution thus obtained, the hydrates are precipitated by any well known means, thus obtaining ZrH₂O₃ which is more or less impure. I dissolve the hydrate, which is acid or maintained so.

To the above solution, which contains the elements in colloidal form, I add a reversible colloid; such as, glue, gelatine, or other suitable substance, which by action on the individual particles of the crystalloids the colloids are separated from the crystalloids, the zirconium colloids in this particular case remaining un-coagulated. I might state here that the ordinary method of separating crystalloids from colloids is by the use of a membranous filtration which is ordinarily understood as dialysation; but I wish it distinctly understood that by my process membranous filtration is not used, but the separation—which I perhaps had inadvertently called dialysation—is performed by means of reversible colloids as a selective agency in the separation, whereby the elementary substances are retained in the gel form.

The above introduction of glue, or other organic reversible colloid, will form a coagulated mass when in contact with crystalloids. This coagulated mass may be separated from the mixture by any well known means; I have used ordinary skimming when separating from the zirconium colloids. Centrifugation may be employed.

In the peptization of zirconium hydrate hydrogels and hydrosols through the use of tantalic acid, I find a simple way of preparing tantalic acid is to fuse in a furnace caustic potash (potassium hydroxide), then introduce one-half by weight, milled or powdered ore of samerskite or tantalite, or other suitable ore. Cook the same about one hour and draw off as previously described. The cakes thus formed are dissolved in hot water super-saturated with HCl, which gives us our tantalic acid.

Before proceeding to peptize the hydrosols, or hydrogels, I wish to explain that the process is reversible, as an illustration, the tantalic acid thus formed by treating the nitric acid with the addition of a small amount of ammonium sulphate and evaporating to a gel may be peptized by metazirconic acid.

Now proceeding to describe the peptization of zirconium hydrate hydrogels and hydrosols through the use of a neutralized solution of tantalic acid, I use a small amount of the acid thus formed added to the colloidal gel above described and obtain an irreversible colloid in the case described of zirconium.

In the forming of insoluble compounds by the mixing of acid and basic soluble colloids, I will give an illustration of a sample of such mixing.

I take the zirconium gel above obtained, thoroughly neutralized by the addition of any suitable neutralizing agent and mix that with the tantalic gel described in the reversal process, being sure that the same is acid, using substantially equal amounts by weight, both being in colloidal form. I obtain an insoluble colloidal precipitation. (In this particular instance cited, while zirconium is attacked by hydrofluoric acid and tantalum is attacked by aqua regia, when in this balanced form neither of the elements mentioned are attacked by the re-agents mentioned, consequently when used carry this characteristic with them).

Describing more specially the use of my process in the selective absorption of an element as a definite means of separation of elementary substances from a mixed compound, take a mixture of zirconium and iron sulphate colloids, heating the same in the presence of paraffin or a hydrocarbon; the heating I accomplish by means of an electric arc between two carbon electrodes, one immersed in the solution and the other above, whereby the paraffin and the sulphur of the iron are eliminated and the iron is left in a ferric state; the ferrous iron is oxidized by heating and burning off the paraffin and the zirconium colloid remains unchanged; then dissolve the residue in water, introducing a reversible colloid such as glue, and a gelatinous mass of zirconium colloid is obtained.

Returning now to the soda cake fusion formed as previously described, which was dissolved in distilled water and allowed to crystallize out, after the crystals have been removed I find the mother liquor very valuable for the introducton of a reversible colloid, such as glue, gelatine, etc. By coagulated colloidal separation of the mass by the said reversible colloid as heretofore described I obtain therefrom the colloids contained therein, which colloids may be treated as the colloids obtained from the crystals but which are not as pure as from the crystals.

Further, the solution of the soda cake fusion before crystallization takes place may be separated simply or compoundly, i. e., by the introduction of lysolbinic acid I obtain the so-called salting out, as known in the soap separation, then by the addition of a reversible colloid, such as glue, etc., I obtain zirconium colloids substantially free from the other metals, such as iron, titanium and aluminum which were susceptible to the salting out process and separated thereby.

In the separation of the solid cake heretofore described through the line of demarcation, wherein the predominant zirconia sulphate was at the bottom, the predominant soda is extremely useful for re-use in my process.

In this solution of zirconium sulphate and ferrous iron, we have a condition where the iron is in a colloidal state and the zirconium is in a colloidal state. That upon the addition of heat the sulphur is set free and burnt off. The colloidal zirconium remains unaffected. In the case of colloidal iron, the sulphur is burnt off and the iron is in contact with the oxygen of $H_2O$ in solution, the iron colloid is under heat sufficient to oxidize the iron from the ferrous to a ferric state, following a well known procedure of redispersing a colloid.

*Paraffin*.—The purpose of the paraffin is to protect the bath from oxidation and from carbonization from the dispersed carbon of the electrodes. This is accomplished by the carbon being burnt in the heat of the arc and by the unburned film up to the point of ignition which protects the dispersed element from the oxygen in the atmosphere.

*Mixed compound*.—The mixed compound referred to in the specifications, that I have used, is best described as follows: The ore used in the illustration given contains zirconium iron and other elements. Its treatment with the nitre cake forms certain compounds of the various elements, and these are what I have designated as mixed compounds, with reference to the iron and zirconium, presumably sulphate of iron, the iron being ferrous, and sulphate of zirconium and probably other compounds of the same.

This application is a division required by the Patent Office from my previous application, filed March 6, 1922, Serial No. 541,374.

Having thus described my invention, what I claim and desire to secure by Letters Patent is:

1. The process of peptizing hydrosols of zirconium consisting of adding tantalic acid to a colloidal mass thereof.

2. The process of forming insoluble precipitates of tantalum and zirconium consisting of mixing acid and basic soluble colloids thereof, thereby obtaining a precipitation of the tantalum and zirconium content thereof as a precipitate.

3. The process of recovering zirconium colloids from a mass containing colloids of other groups by heating said mass comingled with a hydrocarbon to a point above the ignition point of the hydrocarbon, thus dehydrating the same, then dissolving in water and adding an organic reversible colloid to remove crystalloids which are then removed from the mixture, thus separating the zirconium colloids from the co-mingled crystalloids, the zirconium colloids remaining in the fluid.

4. The process of selecting irreversible colloids of the compounds of zirconium from a varying mass of colloidal and crystalloidal elements consisting of separating the mixed mass with a reversible colloid, separating the colloid of the compounds of zirconium from the said mixed mass, then peptizing the zirconium colloid thus separated with tantalic acid, thus rendering the same irreversible.

JOHN L. BROWN.